United States Patent [19]
Reid

[11] Patent Number: 5,033,496
[45] Date of Patent: Jul. 23, 1991

[54] CURRENT TO PRESSURE TRANSDUCER
[75] Inventor: Roney A. Reid, Charleston, S.C.
[73] Assignee: ITT Corporation, New York, N.Y.
[21] Appl. No.: 584,239
[22] Filed: Sep. 18, 1990
[51] Int. Cl.5 ............................................. G05D 16/20
[52] U.S. Cl. .................................... 137/85; 137/487.5; 251/129.06
[58] Field of Search ................... 137/82, 85, 84, 487.5; 251/129.06

[56] References Cited
U.S. PATENT DOCUMENTS 4,325,399  4/1982  Frick ...................................... 137/85
4,481,967  11/1984  Frick ...................................... 137/85
4,630,631  12/1986  Barnes ................................ 137/82 X Primary Examiner—Alan Cohan
Attorney, Agent, or Firm—Menotti J. Lombardi

[57] ABSTRACT

An electro-pneumatic transducer converts an electrical input signal into a proportional (direct or indirect) pneumatic output signal. A circuit will sense the magnitude of the input signal, monitor the output fluid pressure and adjust a piezoelectric beam voltage until a desired output fluid pressure is achieved. The output fluid pressure is controlled by the deflection of a piezoelectric beam which is polarized and will deflect with an applied voltage. The output fluid pressure is monitored by a pressure sensor.

19 Claims, 3 Drawing Sheets

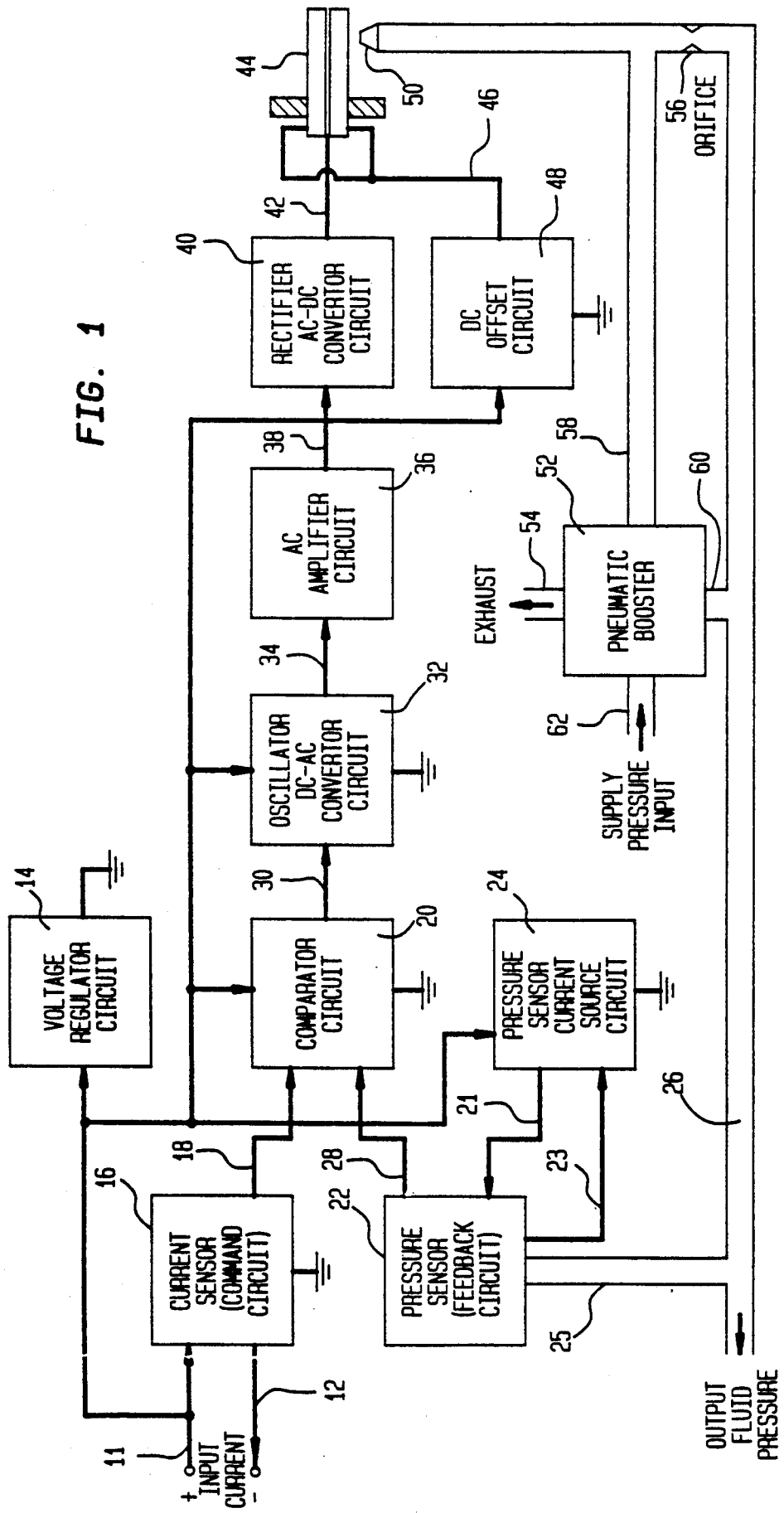

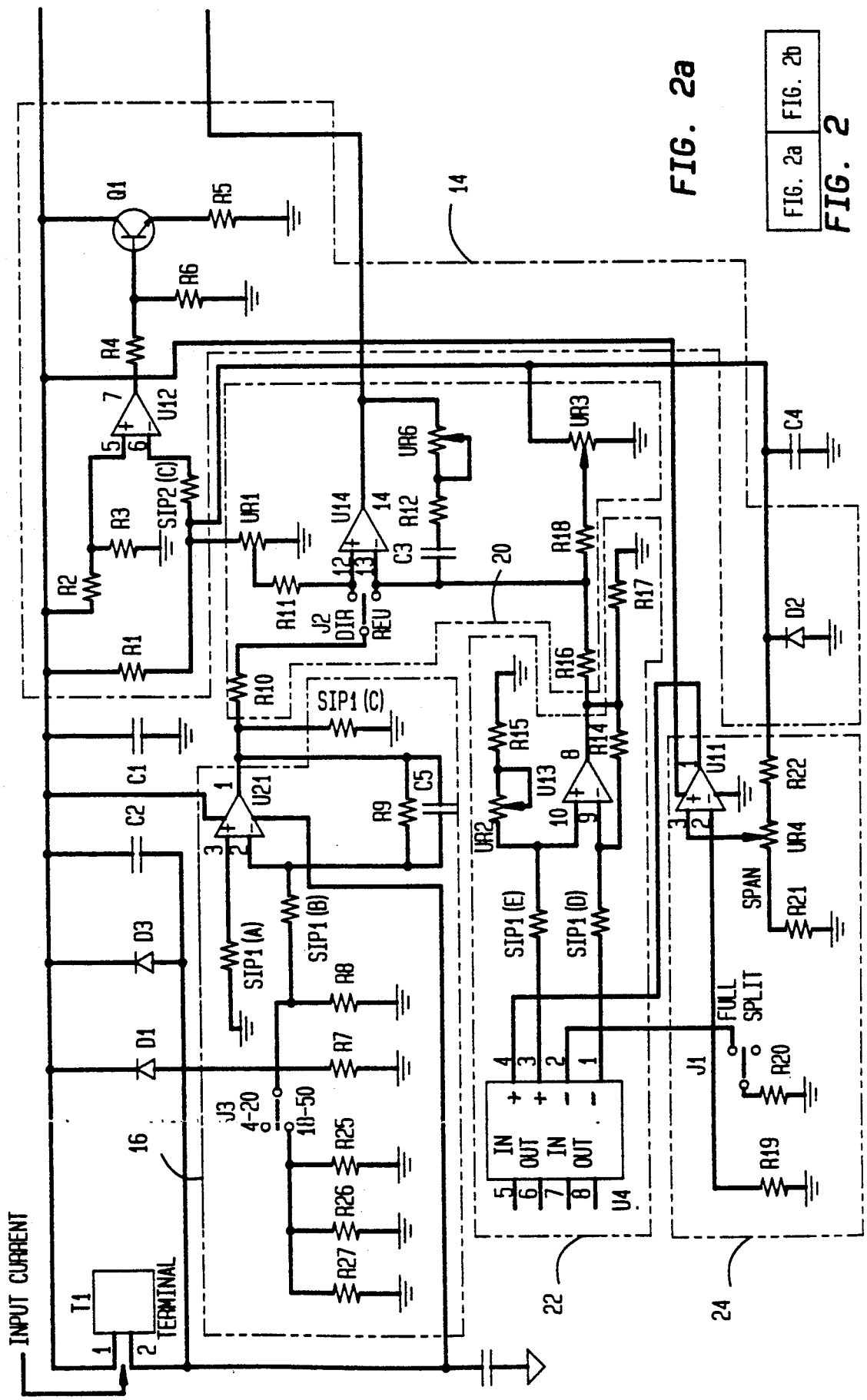

CURRENT TO PRESSURE TRANSDUCER

BACKGROUND OF THE INVENTION

This invention relates to a current to pressure transducer, and more particularly to an electro-pneumatic transducer which converts a current input to a proportional pneumatic output.

Current designs, such as known from U.S. Pat. No. 4,481,967, use a piezoelectric beam driven with a single polarity voltage or a magnetically susceptible element suspended in a magnetic field. The devices which have an element suspended in a magnetic field use a stationary coil to create a net force on the element, moving it toward a nozzle to create a back pressure. Devices which have a piezoelectric beam use a single polarity voltage to drive the beam. A piezoelectric beams' position will creep over time with the applied voltage. The direction of the creep is toward the neutral position. In the case of a single polarity voltage, the beam will eventually creep until the drive voltage can no longer control the beam to achieve the specified output range. Another problem with the piezoelectric beam is the creep due to temperature fluctuations. The polarization of the beam will cause break down when a specified voltage, per mil of piezoelectric beam thickness, is exceeded. The single polarity drive will allow a limited amount of excess voltage to compensate for temperature creep of the piezoelectric beam.

Accordingly, the problems of the prior art are overcome by the invention which incorporates a dual polarity drive voltage.

SUMMARY OF THE INVENTION

An object of the invention is to provide an electro-pneumatic transducer which converts an electrical input to a proportional pneumatic output.

According to the broader aspects of the invention, a piezoelectric beam is driven in two directions with a dual polarity voltage, which allows any creep (drift), of the piezoelectric beam to the neutral or unbiased position, and toward the middle of the driving voltage as opposed to the rail of a single polarity drive voltage.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 1 is block diagram of the apparatus according to the invention; and

FIGS. 2, 2a and 2b is circuit diagram for implementing the block diagram of FIG. 1.

DETAILED DESCRIPTION OF THE PREFERRED EMBODIMENT

Figure 2B:
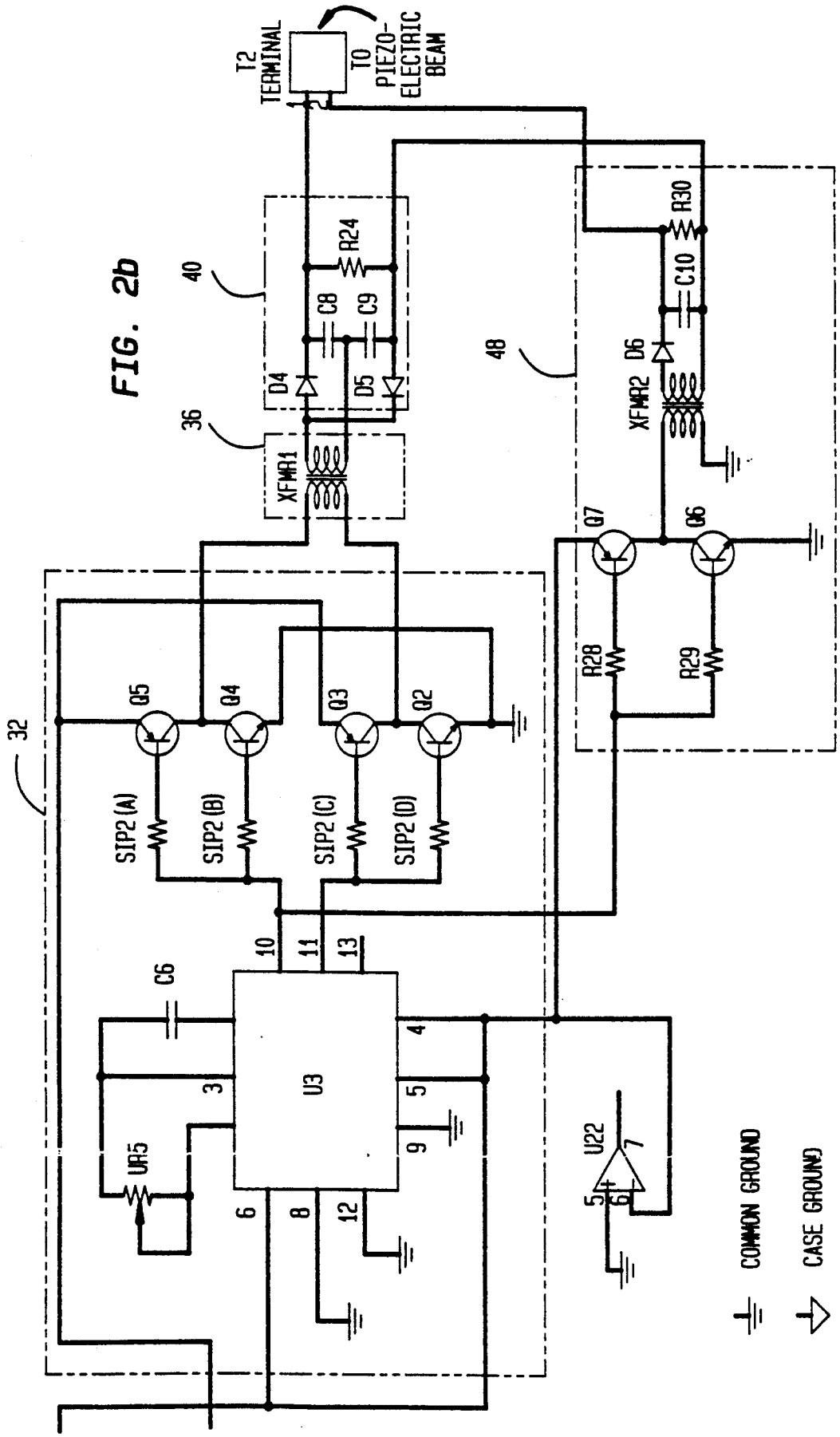

FIG. 1 shows a block diagram of the apparatus according to the invention. A 4-20 or 10-50 mA DC input current is coupled to terminals 11,12. A voltage regulator 14 coupled to terminal 11 holds a constant DC voltage for the circuits of the apparatus and couples excess current to circuit common ground. In order to determine what the output fluid pressure should be, a DC current sensor (command circuit) 16 monitors the input DC current and sends a DC command signal via line 18 to a comparator 20. A pressure sensor (feedback circuit) 22 is coupled by lines 21,23 to a pressure sensor DC current source 24 which determines the sensitivity, and thus the span, of the pressure sensor. Therefore, the pressure sensor DC current source 24 is used as the manual span adjustment. The pressure sensor 22 is coupled by fluid line 25 to monitor the output fluid pressure in fluid line 26 and to send a proportional DC feedback signal 28 to the comparator 20.

The comparator 20 monitors the DC command signal 18 and the DC feedback signal 28 and provides a DC control signal 30. When the DC command signal 18 is greater than the DC feedback signal 28, the DC control signal 30 increases. The DC control signal 30 decreases when the DC command signal 18 is less than the DC feedback signal 28. An oscillator 32 converts the DC command signal 30 to a proportional AC signal 34, and an AC amplifier 36 increases the value of the oscillators' AC signal 38 proportionally. A rectifier 40 converts the AC amplifiers' signal 38 to a DC signal 42. The DC output signal 42 of the rectifier 40 is proportionally larger than the DC control signal 30.

The DC output signal 42 of the rectifier 40 is applied to the middle of the piezoelectric plates forming the piezoelectric beam 44. A DC offset voltage 46 from circuit 48 is applied to both the top and bottom of the piezoelectric plates forming the piezoelectric beam 44 to allow dual polarity to be applied to the piezoelectric beam. Combined, the DC output signal 42 of the rectifier 40 and the DC offset voltage 46 become a DC drive voltage for the piezoelectric beam 44. The DC drive voltage causes the piezoelectric beam to defect toward and away from a nozzle 50 with respect to the neutral or unbiased position of the beam. When the output 42 of the rectifier circuit increases, the piezoelectric beam 44 is driven toward the nozzle 50 creating a back pressure via fluid line 58 in a pneumatic booster 52 thus causing a net increase in output fluid pressure in fluid line 26 via fluid line 60. When the output 42 of the rectifier circuit decreases, the piezoelectric beam 44 is driven away from the nozzle 50 allowing the fluid in the pneumatic booster 52 to escape and, therefore, the output fluid can exhaust by fluid line 54 thus causing a net decrease in output fluid pressure. An orifice 56 causes a pressure drop between a controlling chamber and output chamber of the pneumatic booster 52. The fluid in the controlling chamber feeds the nozzle by fluid line 58; and the fluid in the output chamber is coupled by fluid line 60 to the output fluid pressure line 26. A pneumatic booster arrangement of this type is known from model type GT300 Electro-Pneumatic Transducers (ITT Conoflow, St. George, South Carolina).

Referring now to FIG. 2, the input current is received at terminal T1. Capacitor C2 prevents errors and instabilities due to noise on the input current. Diodes D1 and D3 are to protect the circuit from misapplication of a large voltage or reversal of the input leads. Capacitors C1 and C4 also help eliminate any AC noise from affecting the operation of the circuit. Capacitor C7 prevents the output of the circuit from drifting due to EMI. Op amp U22 is an unused op amp biased to not consume current.

A voltage regulating circuit 14 is connected between conductors 1 and common ground to maintain a voltage that will power the circuits and dump excess current from conductor 1 and Common Ground. The voltage regulating circuit consists of op amp U12, transistor Q1, diode D2, and resistors R1, R2, R3, R4, R5, R6, and SIP2(E).

The current sensor (command circuit) 16 monitors the input current and sends a proportional command signal to the comparator circuit 20. A voltage drop is formed across the monitoring resistors and is amplified to a desired level for the command signal. Jumper J3 allows for either 4-20 mA or 10-50 mA input current. The command circuit 16 consists of op am U21, jumper J3, capacitor C5, and resistors R7, R8, R9, R25, R26, R27, SIP1(A), SIP1(B), and SIP1(C).

The pressure sensor (feedback circuit) 22 monitors the output fluid pressure and sends a proportional feedback signal to the comparator circuit 20. A piezoresistive sensor bridge U4 (I C Sensors, Model 1210A, Milpitas, California) changes the resistance across various legs of the bridge as the pressure changes; therefore, giving a proportional output voltage due to the monitored fluid pressure. The feedback circuit amplifies the voltage output of the piezoresistive bridge to a desired feedback signal. Potentiometer VR2 is used to zero the feedback signal when the monitored fluid pressure is zero (0). The feedback circuit 22 consists of op amp U13, pressure sensor U4, potentiometer VR2, and resistors R14, R15, R17, SIP1(D), and SIP1(E).

A pressure sensor current source 24 supplies supply current to the piezoresistive bridge U4. Potentiometer VR4 is a manual adjustment for the magnitude of current supplied to the piezoresistive bridge, and therefore, determines the magnitude of the feedback signal for a given output fluid pressure. Potentiometer VR4 manually adjusts the voltage to the non-inverting input of op amp U11 causing the current supplied to the piezoresistive bridge and the monitoring resistors R19 and R20, to be at a magnitude that will stabilize the voltage at the inverting input of op amp U11 to be equivalent to that at the non-inverting input. Jumper J1 allows for full scale output fluid pressure adjustment for one half (½) of full scale input current adjustment. The pressure sensor current source 24 consists of op amp U11, potentiometer VR4, jumper J1, and resistors R19, R20, R21, and R22.

The comparator circuit 20 monitors the command signal and feedback signal to output a control signal that will maintain a predetermined relationship between the command signal and feedback signal for a given command signal. Potentiometers VR1 and VR3 are manually adjusted to set the predetermined relationship between the command signal and feedback signal. Potentiometer VR3 is used to center potentiometer VR1 for adjustment of the predetermined relationship of the command signal and feedback signal solely using VR1 regardless of the positions of user adjustment jumpers J1, J2, and J3. Potentiometer VR6 adjusts the internal response of the control signal, due to a change in the command signal or feedback signal, to alleviate the output fluid pressure from getting into a resonant oscillation with the control circuit by changing the RC value of C3, R12, and VR6. Jumper J2 allows the output fluid pressure to be manually changed from directly proportional to inversely proportional, or vice versa, with respect to the input current. The comparator circuit 20 consists of op amp U14, capacitor C3, jumper J2, potentiometers VR1, VR3, and VR6, and resistors R10, R11, R12, R16, and R18.

An oscillator DC to AC circuit 32 transforms the DC control signal into a proportional AC signal. Potentiometer VR5, in combination with capacitor C6, is for manual adjustment of the AC frequency to minimize losses due to heating of the components in the AC portion of the control circuit. The oscillator DC to AC converter consists of multivibrator U3, transistors Q2, Q3, Q4, and Q5, capacitor C6, potentiometer VR5, and resistors SIP2(A), SIP2(B), SIP2(C), and CIP2(D).

An AC amplifier circuit 36 amplifies the AC output signal from the oscillator DC to AC converter 32. The AC amplifier circuit is transformer XFMR1.

A rectifier AC to DC converter circuit 40 transforms the AC signal from the AC amplifier circuit to a proportional DC signal. The rectifier AC to DC converter circuit 40 is a voltage doubler circuit consisting of diodes D4 and D5, capacitors C8 and C9, and resistor R24. The output of a DC offset circuit 48 is combined with the output of the rectifier AC to DC converter circuit 40 to form a dual polarity drive voltage at terminal T2. The DC offset circuit consists of transistors Q6 and Q7, transformer XFMR2, diode D6, capacitor C10, and resistors R28, R29, and R30. A piezoelectric beam is connected to terminal T2 and is driven toward and away from a nozzle to create a desired back pressure.

A supply fluid pressure is supplied via fluid line 62 to a pneumatic booster 52. The back pressure created by the piezoceramic beam is connected to a control chamber via fluid line 58 in the pneumatic booster 52 that opens a pilot valve and allows the supply fluid to enter an output chamber of the pneumatic booster. There is a pressure drop across the pilot valve that allows different output pressures due to the amount of opening in the pilot valve. There is an orifice 56 between the output chamber and the control chamber to allow fluid to flow to the control chamber and nozzle 50, as well as, create a pressure drop between the output chamber and control chamber. When the piezoelectric beam moves away from the nozzle, the fluid in the control chamber is able to escape causing a reduction in the magnitude of pressure in the control chamber. The pressure reduction in the control chamber causes the fluid in the output chamber to escape through the exhaust port 54 causing a reduction in the output fluid pressure. When the piezoelectric beam moves toward the nozzle, the fluid in the control chamber escapes at a slower rate causing an increase in the magnitude of pressure in the control chamber. The pressure increase in the control chamber causes the pilot valve to open letting input pressure to flow into the output chamber causing an increase in the output fluid pressure.

Typical values for the components shown in the circuit diagram of FIG. 2 are as follows:

C1, C4, C7—4.7uf/35V
C2—0.01uf
C3, C5—0.33uf
C6, C8, C9, C10—0.0022uf
D1, D3—IN4737A
D2—ICL8069CMSQ
D4, D5, D6—IN4007
Q1, Q2, Q4, Q6—2N2222A
Q3, Q5, Q7—2N2907A.
R1—12.1K ohms
R2—107K ohms
R3—27.4K ohms
R4—5.23K ohms
R5—23.2K ohms
R6—221K ohms
R7, R8, R25, R26, R27—10K ohms
R9—750K ohms
R10, R16—499K ohms
R11, R18—1M ohms
R12—2M ohms R14—3.01M ohms
R15—2.43M ohms
R17—56.2K ohms
R19, R20—1K ohms
R21—34.1K ohms
R22—294K ohms
R24—6.49M ohms
R28, R29—100K ohms
R30—4.02M ohms
SIP1, SIP2—100K ohms
U1—LP324N
U2—TLC27L2IP
U3—CD4047BE
U4—1210A
VR1, VR3—20K ohms pot
VR2—1M ohms pot
VR4—50K ohms pot
VR5—100K ohms pot
VR6—2M ohms pot
XFMR1—20:1
XFMR2—10:1

While the present invention has been disclosed in connection with a preferred embodiment thereof, it should be clearly understood that there may be other embodiments which fall within the spirit and scope of the invention as defined by the following claims.

What is claimed is:

1. Current to pressure transducer apparatus comprising:
    a source of variable input DC current;
    voltage regulator means responsive to said variable input DC current for maintaining a constant DC voltage for said apparatus;
    current sensor means responsive to said variable input DC current for providing a DC command signal which is a function of the magnitude of said input current and independent of the magnitude of the regulated DC voltage;
    pressure sensor means coupled for monitoring an output fluid pressure and for providing a DC feedback signal which is a function of said output fluid pressure and independent of the magnitude of the regulated DC voltage;
    means coupled for providing a DC control signal which is a function of the magnitude of the DC command signal and the DC feedback signal;
    means responsive to said DC control signal for providing a DC output signal;
    a piezoelectric beam having two piezoelectric plates, said DC control signal being coupled to the middle of said plates;
    means coupled to said plates for applying a DC offset voltage to said beam; and
    said DC output signal and DC offset voltage combining to drive said beam in one of two directions.

2. The apparatus of claim 1 including means for providing said output fluid pressure.

3. The apparatus of claim 2 wherein said means for providing said output fluid pressure includes:
    a nozzle;
    an orifice;
    means for providing fluid pressure to said nozzle through said orifice; and
    an output fluid pressure line connected between said means for providing fluid pressure and said orifice.

4. The apparatus of claim 3 wherein said beam is positioned to be driven toward or away from said nozzle.

5. The apparatus of claim 4 wherein when said beam is driven away from said nozzle, said means for providing fluid pressure causes a decrease in the output pressure, and when said beam is driven toward said nozzle, said means for providing fluid pressure causes an increase in the output pressure.

6. The apparatus of claim 1 wherein said means responsive to said DC control signal for providing a DC output signal includes:
    an oscillator converter circuit;
    an AC amplifier circuit; and
    a rectifier converter circuit.

7. The apparatus of claim 1 wherein said pressure sensor means includes:
    a pressure sensor feedback circuit; and
    a pressure sensor current source circuit.

8. The apparatus of claim 3 including
    a supply pressure input source and an exhaust means being fluid coupled to said means for providing fluid pressure.

9. The apparatus of claim 1 wherein said DC offset voltage applied to said piezoelectric plates permits said DC signal coupled to the middle of said plates to be positive or negative.

10. Apparatus for providing an output fluid pressure at an output which is a linear function of a variable input DC current over a specified range, comprising:
    a current sensor circuit electrically connected to receive said input current and to provide a command signal that is a function of the magnitude of said input current;
    voltage regulating means electrically connected for deriving from said input current a regulated DC voltage;
    pressure sensor means electrically connected to a constant current source and coupled to the output fluid pressure to provide a DC feedback signal having a magnitude that is a function of the output fluid pressure and the constant current source;
    comparator means for comparing said command signal and said feedback signal to provide a DC control signal which is a function of the magnitude of said command and feedback signals;
    means for providing the output fluid pressure at the output as a function of a magnitude of the DC control signal;
    said comparator means adjusts the magnitude of the DC control signal until the magnitudes of the command and feedback signals have a predetermined relationship; and
    means for adjusting the magnitude of the output of said constant current source to change the magnitude of the output fluid pressure as a function of the magnitude of the input current.

11. The apparatus of claim 10 including means for zero adjusting of the DC control signal to set a predetermined relationship between the magnitudes of the command and feedback signals.

12. The apparatus of claim 11 wherein the means for providing the output fluid pressure includes:
    a DC drive voltage; and
    a piezoelectric beam which bends as a function of the magnitude and polarity of said DC drive voltage.

13. The apparatus of claim 12 including means for converting said DC control signal to a DC voltage which is greater in magnitude and proportional to said DC control voltage and for combining with a DC offset voltage to comprise said DC drive voltage with dual polarity to drive said piezoelectric beam in two directions from the neutral or unbiased position.

14. The apparatus of claim 13 including:
a nozzle positioned adjacent one end of said beam;
means for providing fluid pressure to said nozzle, and the amount of fluid escaping from said nozzle being a function of the movement of said one end; and
means fluid connected between the nozzle and the output for providing the output pressure as a function of the amount of fluid escaping from the nozzle.

15. In combination:
a source of variable input DC current;
voltage regulator means responsive to said variable input DC current for maintaining a constant DC voltage for said apparatus;
current sensor means responsive to said variable input DC current for providing a DC command signal which is a function of the magnitude of the regulated DC voltage;
pressure sensor means including a pressure sensor feed back circuit and a pressure sensor current source, coupled for monitoring an output fluid pressure and for providing a DC feedback signal which is a function of said output fluid pressure and independent of the magnitude of the regulated DC voltage;
means for providing a DC control signal which is a function of the magnitude of the DC command signal and the DC feedback signal;
means including an oscillator converter circuit, an AC amplifier circuit, and a rectifier converter circuit coupled responsive to said DC control signal for providing a DC output signal;
a piezoelectric beam having two piezoelectric plates, said DC output signal being coupled to the middle of said plates;
means coupled to said plates for applying a DC offset voltage to said beam, and said DC output signal being positive or negative and DC offset voltage combining to drive said beam in one of two directions; and
means for providing said output fluid pressure including a nozzle positioned adjacent said beam, and means for providing fluid pressure to said nozzle through an orifice.

16. The apparatus of claim 4 wherein when said beam is driven away from said nozzle, said means for providing fluid pressure causes a decrease in the output pressure, and when said beam is driven toward said nozzle, said means for providing fluid pressure causes an increase in the output pressure.

17. In combination:
a variable input DC current;
a current sensor circuit electrically connected to receive said input current over a specified range and to provide a command signal that is a function of the magnitude of said input current;
voltage regulating means electrically connected for deriving from said input current a regulated DC voltage;
pressure sensor means electrically connected to a constant current source and fluid coupled to the output fluid pressure to provide a DC feedback signal having a magnitude that is a function of the output fluid pressure and the constant current source;
comparator means for comparing said command signal and said feedback signal to provide a DC control signal which is a function of the magnitude of said command and feedback signals, said comparator means adjusts the magnitude of the DC control signal until the magnitudes of the command and feedback signals have a predetermined relationship;
means for providing the output fluid pressure at the output as a function of a magnitude of the DC control signal including a DC drive voltage, a piezoelectric beam which bends as a function of the magnitude and polarity of said DC drive voltage, and a nozzle positioned adjacent one end of said beam;
means for adjusting the magnitude of the output of said constant current source to change the magnitude of the output fluid pressure as a function of the magnitude of the input current; and
means for zero adjusting of the DC control signal to set a predetermined relationship between the magnitudes of the command and feedback signals.

18. The combination of claim 17 including means for converting said DC control signal to a DC voltage which is greater in magnitude and proportional to said DC control voltage and for combining with a DC offset voltage to comprise said DC drive voltage with dual polarity to drive said piezoelectric beam toward and away from said nozzle.

19. The combination of claim 18 including:
means for providing fluid pressure to said nozzle, and the amount of fluid escaping from said nozzle being a function of the movement of said beam toward and away from said nozzle; and
means fluid connected between the nozzle and the output for providing the output pressure as a function of the amount of fluid escaping from said nozzle.

* * * * *